Patented Aug. 3, 1943

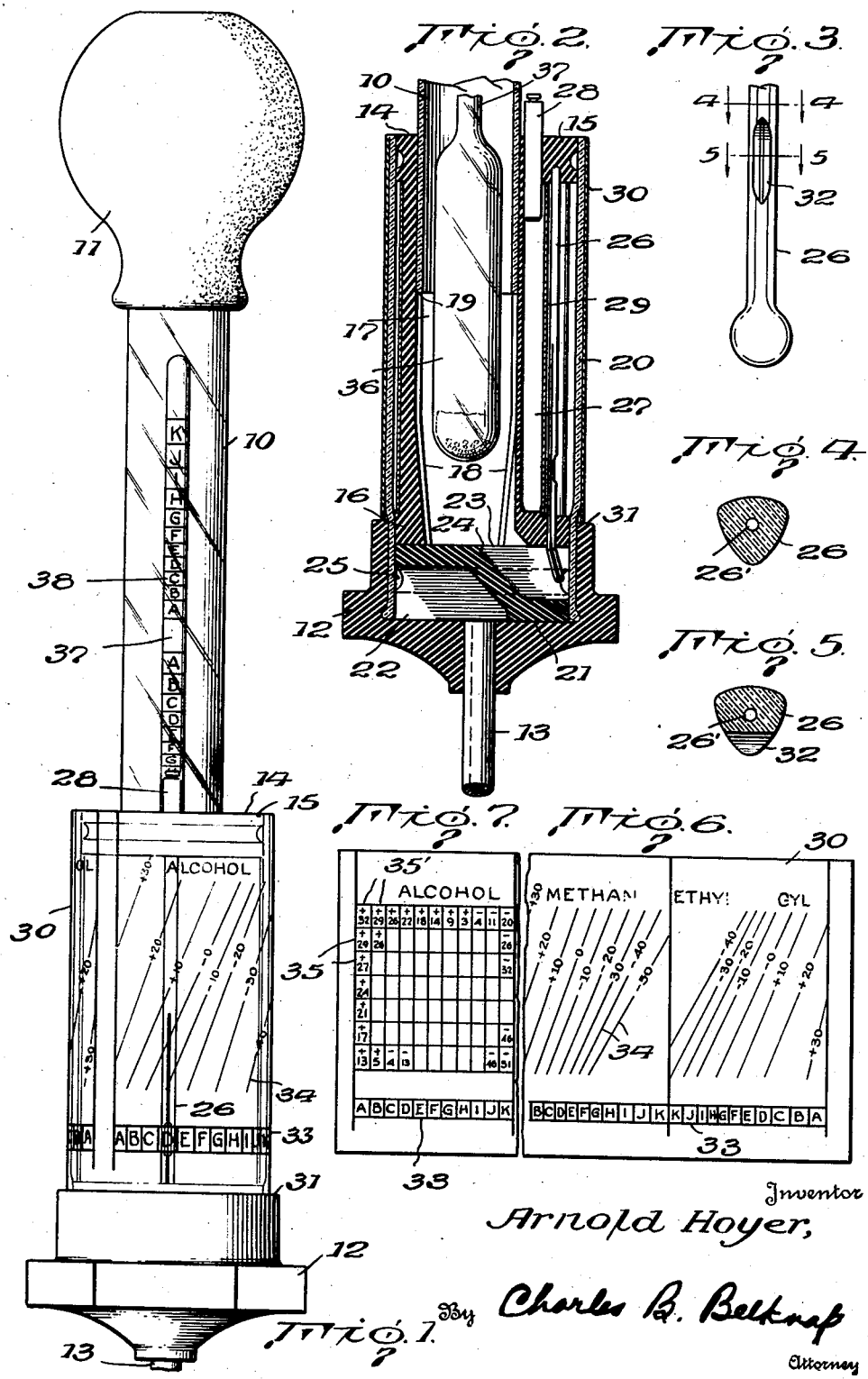

2,325,776

UNITED STATES PATENT OFFICE 2,325,776

HYDROMETER

Arnold Hoyer, Conshohocken, Pa., assignor to Kimble Glass Company, Vineland, N. J., a corporation of Illinois Application March 26, 1940, Serial No. 326,086

2 Claims. (Cl. 265—46)

The present invention relates to hydrometers having associated therewith a thermometer, and more particularly to a movable correction element including a chart on the hydrometer designed so to cooperate with the thermometer that temperature corrections for specific gravity readings may be readily made in a minimum of time.

Thermo-hydrometers for testing antifreeze solutions are customarily provided with a float having graduations thereon to indicate the specific gravity of the tested solution. Specific gravity will, however, vary with temperature changes. To permit accurate determination of the freezing temperature of the solution, correction charts are usually employed, these charts being provided with data corresponding respectively to several temperatures and specific gravities.

It is an object of the present invention to provide a transparent cursor having thereon correction data, the cursor being movable with respect to the hydrometer barrel to permit positioning of the data relative to the thermometer so that a direct reading may be made.

Still another object of the invention is an illuminating device associated in a novel manner with the correction chart to enable one employing the hydrometer to make readings at night or under other unfavorable conditions.

Other objects will be apparent from the following description of the hydrometer when read in connection with the accompanying drawing, in which—

Fig. 1 is a front elevation of the thermohydrometer and the cursor associated therewith;

Fig. 2 is a fragmentary longitudinal sectional view of the hydrometer;

Fig. 3 is a fragmentary view of the thermometer employed in the hydrometer;

Fig. 4 is a section taken on line 4—4 of Fig. 3;

Fig. 5 is a section taken on line 5—5 of Fig. 3;

Fig. 6 is a partial elevation of one form of cursor used in connection with the present hydrometer; and Fig. 7 is a partial elevation of a modified form of cursor.

In the drawing, the hydrometer is shown as comprising the conventional barrel 10, rubber suction bulb 11, and rubber nozzle 12 with a suction tip 13 fitting therein. Surrounding the lower end of barrel 10 and fitting closely thereon is an elastic sleeve 14 having upper and lower radially extending circular flanges 15 and 16 and being provided with a bore 17 to accommodate barrel 10. Longitudinal ribs 18 extend partially the length of bore 17, the ends thereof forming shoulders 19 which limit the distance to which the barrel may be inserted in the bore. In the form of the invention illustrated herein, bore 17 is shown as being eccentric with respect to flanges 15, 16, but, if desired, the bore and flanges may be concentric. Fitting tightly to the flanges and adapted to be supported thereby is a glass cylinder 20, the lower end of which is reduced and supports nozzle 12. Within the reduced lower end of cylinder 20 and forming a snug fit therewith is a plug 21 having pockets 22, 23 separated by wall 24 but connected by a communicating circumferential groove 25. Thus, liquid drawn through tip 13 will first enter pocket 22, then pass around the groove 25 into pocket 23, thence into bore 17 and barrel 10.

In the embodiment of the hydrometer shown in the drawing, there is provided between cylinder 20 and sleeve 14 in that longitudinal diametral plane corresponding to the greatest eccentricity between bore 17 and cylinder 20, a space sufficiently large to accommodate a thermometer 26. A recess 27 is also formed in sleeve 14 in this same plane, there being a small dry battery and lamp 28 positioned in this recess for a purpose to be explained hereinafter. Attached to sleeve 14 and extending substantially from flange 15 to flange 16 is a background of white or other light colored material indicated at 29. This material may be either in the form of a circumferential sleeve or at least of a width sufficient to underlie and extend somewhat to each side of thermometer 26.

Surrounding cylinder 20 and fitting snugly thereon, but rotatably movable with respect to the cylinder, is a cursor 30 made of pyroxylin, cellulose nitrate, or some other suitable transparent material adapted to have printed, etched or otherwise inscribed thereon a correction chart. As will be seen in Figs. 1 and 2, the lower end of the cursor rests on shoulder 31 of nozzle 12, this shoulder acting as a guide and support to provide a predetermined vertical relation between the cursor and the thermometer column.

Referring to Figs. 3, 4, and 5, it will be seen that the thermometer is that type having a crosssection such that, when viewed from the front thereof, the column of colored liquid in the bore 26' will be magnified transversely, that is, the column will appear much wider than it actually is. This magnification tends to make reading of data immediately in front of the column difficult. To obviate this difficulty, the thermometer is cut away at 32 a distance above the lower end of cursor 30 corresponding with a horizontal row 33 of data representing specific gravities. Thus the lens effect of the thermometer is eliminated and only a thin column is visible behind the data in row 33 so that the data may be easily read.

The chart printed on the cursor may consist of a series of temperature lines 34, as shown in Fig. 6, or series of intersecting horizontal columns 35 and vertical columns 35' representing freezing temperatures. The customary hydrometer float 36 is disposed in barrel 10 and is provided with a reduced stem portion 37 having a scale 38 which indicates the specific gravity of the liquid being tested.

When using the hydrometer the specific gravity of the liquid is first determined from the scale 38. The cursor is then rotated until the letter corresponding to the scale reading is in alignment with the thermometer. The height of the column of colored liquid in the thermometer will then be observed and that point of the chart immediately in front of the top of the colored liquid will furnish the operator with a visual indication of the freezing point of the liquid under test. If the chart be one of the type shown in Figs. 1 and 6, the reading is approximate but sufficiently accurate for practical purposes. In Fig. 1, for instance, it will be seen that the cursor is set for a reading corresponding to a specific gravity of "D." Following the thermometer liquid it is apparent that the top of the liquid column in the thermometer underlies a point approximately midway between the lines representing temperatures of 0° and +10°. The freezing temperature of the antifreeze solution under test would, therefore, be +5°. A chart similar to that shown in Fig. 7 would, of course, furnish a direct reading, there being a temperature figure in each of the squares formed by the intersecting columns.

When it is desired to illuminate the chart and thermometer, which may be necessary when using the hydrometer at night, the lamp 28, held in recess 27, is lighted.

While the invention has been shown and described with reference to a particular embodiment thereof, it is not intended that it be limited to the exact details and arrangement of parts illustrated herein. The invention is, therefore, to be construed in terms defined by the appended claims.

Having described my invention, what I claim and desire to secure by Letters Patent is:

1. In combination with a hydrometer having a transparent barrel, a flexible sleeve mounted on said barrel and having radial flanges at the ends thereof, a transparent cylinder fitting closely over said flanges to form a space between the cylinder and the barrel, said space being sealed off from the barrel, a suction nozzle on said cylinder, a plug in said cylinder, said plug having two communicating pockets, one in communication with the barrel, the other communicating with said nozzle, a thermometer disposed in the space between said sleeve and said barrel, said thermometer passing through one of said flanges and having its bulb portion disposed in said one pocket, and a transparent cursor mounted on said cylinder for movement relative thereto, said cursor having thereon indicia selectively superposable over the thermometer for determining the freezing temperature of liquid in the hydrometer.

2. In combination with a hydrometer having a transparent barrel, a flexible sleeve mounted on said barrel and having radial flanges at the ends thereof, a transparent cylinder fitting closely over said flanges to form a space between the cylinder and the barrel, said space being sealed off from the barrel, a thermometer disposed in the space between said sleeve and said barrel, said thermometer passing through one of said flanges and having its bulb portion so positioned that it is in direct contact with liquid in the barrel, a transparent cursor mounted on said cylinder for movement relative thereto, said cursor having thereon indicia selectively superposable over the thermometer for determining the freezing temperature of liquid in the hydrometer, and illuminating means, said sleeve being provided with a recess adjacent said thermometer, said recess accommodating said illuminating means.

ARNOLD HOYER.